United States Patent
Franz et al.

(10) Patent No.: US 10,563,286 B2
(45) Date of Patent: Feb. 18, 2020

(54) ELECTROSLAG REMELTING PROCESS AND MELTING VESSEL

(71) Applicant: ALD VACUUM TECHNOLOGIES GMBH, Hanau (DE)

(72) Inventors: Henrik Franz, Freigericht-Horbach (DE); Ulrich Biebricher, Niddatal (DE); Harald Scholz, Rodenbach (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 0 days.

(21) Appl. No.: 16/302,880

(22) PCT Filed: May 23, 2017

(86) PCT No.: PCT/EP2017/062450
§ 371 (c)(1),
(2) Date: Nov. 19, 2018

(87) PCT Pub. No.: WO2017/202857
PCT Pub. Date: Nov. 30, 2017

(65) Prior Publication Data
US 2019/0144969 A1    May 16, 2019

(30) Foreign Application Priority Data
May 25, 2016  (DE) .......... 10 2016 109 712

(51) Int. Cl.
*B22D 23/10*   (2006.01)
*B22D 2/00*    (2006.01)
(Continued)

(52) U.S. Cl.
CPC .............. *C22B 9/18* (2013.01); *B22D 2/006* (2013.01); *B22D 11/182* (2013.01);
(Continued)

(58) Field of Classification Search
CPC .......... B22D 2/00; B22D 2/006; B22D 11/16; B22D 11/18; B22D 11/182; B22D 11/20; B22D 11/202; B22D 23/10
(Continued)

(56) References Cited

U.S. PATENT DOCUMENTS 4,320,656 A * 3/1982 Tiskus .................. G01F 23/22
                                                            73/295
6,776,217 B1   8/2004 Streubel et al.
(Continued)

FOREIGN PATENT DOCUMENTS

DE    4207694 A1   9/1993
DE   19956577 A1   5/2001
(Continued)

OTHER PUBLICATIONS

Hasse, S., Giessereilexikon, 19 Edition, 2008, S. 316- ISBN 978-3-7949-0753-3, Fachverlag Spiele & Schon GmbH, Berlin.

*Primary Examiner* — Kevin P Kerns
(74) *Attorney, Agent, or Firm* — Hudak, Shunk & Farine Co. LPA

(57) ABSTRACT

A melting vessel for performing an electro-slag melting method and such a method are presented. Measuring devices measuring a temperature at different heights allow conclusions about position and height of a slag zone in the melting vessel during the method.

21 Claims, 5 Drawing Sheets

(51) Int. Cl.
  *B22D 11/20* (2006.01)
  *C22B 9/18* (2006.01)
  *G01K 13/02* (2006.01)
  *B22D 11/18* (2006.01)

(52) U.S. Cl.
  CPC ............ B22D 11/202 (2013.01); B22D 23/10 (2013.01); G01K 13/02 (2013.01)

(58) Field of Classification Search
  USPC .................. 164/497, 509, 452, 151.4, 450.3
  See application file for complete search history.

(56) References Cited

U.S. PATENT DOCUMENTS

2011/0277950 A1    11/2011   Holzgruber et al.
2013/0333473 A1*   12/2013   Cestari et al. ........... B22D 2/00
                                                    73/584

FOREIGN PATENT DOCUMENTS

| DE | 102011114556 A1 | 4/2013 |
| EP | 2386366 A2 | 11/2011 |
| JP | 62-284023 A | 12/1987 |
| JP | 63-072837 A | 2/1988 |

* cited by examiner

ELECTROSLAG REMELTING PROCESS AND MELTING VESSEL

FIELD OF THE INVENTION

The invention relates to a remelting method for metals and metal alloys. It also relates to a suitable melting vessel, in particular a mould, and uses of this melting vessel.

BACKGROUND OF THE INVENTION

In order to obtain high-purity materials, bodies made of this material are remelted. A well-known remelting method is the so-called electro-slag remelting method. In this remelting method, a melting vessel is usually provided in which a melting electrode is remelted. The remelting of the electrode is performed by current flow through the electrode, whereby normally very high currents flow at relatively low voltages. In order to avoid an electrolytic effect that can occur with direct current, alternating current is usually used. In electro-slag remelting, the slag serves as a heating element and refining bath. The current flows via the electrode through the slag zone and the ingot. Due to the resistance of the slag, it heats the tip of the electrode and melts it. The resulting drops of molten metal or metal alloy are refined as they pass through the slag zone. The tip of the electrode is immersed into the slag zone. The slag zone floats on molten metal or metal alloy. The slag zone thus also ensures a sealing-off of the liquid metal from the surrounding atmosphere. Usually, mixtures of calcium fluoride, calcium oxide and aluminium oxide are used as slags. However, pure mixtures of calcium oxide, magnesium oxide, aluminium oxide or silicon dioxide can also be used. The slag must have a low melting point, high stability, low volatility and good reactivity for refining. Impurities in the electrode material are removed both by solution in the slag and by chemical reaction with the slag.

In electro-slag remelting methods, in which the ingot is withdrawn from an opened melting vessel or the melting vessel is moved upwards, it is of decisive importance that the position of the boundary surface between slag and ingot (or between slag and liquid metal) relative to the mould is kept almost constant during the process, among other things to avoid thermal overload or damage to the plant. The challenge here is to compensate the volume build-up on the ingot, which is determined by the melting rate, correspondingly by the withdrawal speed of the ingot or by the lifting speed of the mould. Due to the different (partly indefinite) density of the melt material in the area of the electrode and the ingot, simple volume calculations from the melt rate show an insufficient accuracy, which can ultimately lead to drift effects. Reliable determination and control of the positions are of decisive importance for process and operational safety. Otherwise, there is a risk of slag leaking (if the position is too deep in the melting vessel) or slag overflow (if the position is too high in the melting vessel).

The electro-slag remelting method differs significantly from other processes, such as continuous casting, in that in electro-slag remelting there are not only two boundary surfaces between ingot and metal melt and between melt and gas phase, but three boundary surfaces: ingot/metal melt, metal melt/slag and slag/gas phase. It is not sufficient for the process control to determine the position of one of the three boundary surfaces, since the height of the slag zone is not constant. Instead, slag is continuously discharged from the slag zone, forming a slag skin on the ingot produced. In addition, the height of the molten metal is not constant. Thus, the determination of the position and height of the slag zone during electro-slag remelting is extremely complex and, in particular, much more complex than in methods with only two boundary surfaces.

In order to overcome the problem, various solutions are applied which substantially rely on monitoring the slag level during the remelting method. Both optical measuring methods and radar-based distance measurements are employed. EP 2 386 366 A2 discloses a radar-based measurement of the slag level. The distance measurement used in earlier times using isotope radiations is no longer up to date.

Besides the difficulties resulting from the volumetric calculation, the determination of the position is further complicated by the fact that a layer of slag solidified at the ingot is permanently withdrawn from the system and as a consequence the mass (or height) of the slag can change during the course of the process. With prior art methods, only the position of the surface of the slag zone can be directly determined, but not its extent, i.e. its height in the melting vessel.

A visual check of the slag level is not easily possible during the method, since normally closed systems are used, i.e. the melting vessel is closed with a hood. A continuous visual monitoring of the slag level would not be practicable anyway, because there is a strong smoke development so that abrupt changes of the slag level would not be noticed immediately. Closed systems generate more dust due to the reduced gas exchange. Video systems, which were sometimes used in the prior art, tended to take incorrect measurements due to dust and smoke generation; moreover, the camera's viewing angle and the temperatures on the inner wall do not permit a clear determination. Furthermore, it can be useful to allow variation of the slag zone within certain limits in order to increase the service life of the mould. This requires a particularly careful and continuous determination of the slag level and can be determined from the heat flow over the vessel wall.

JP S63-72837 A describes a method for electro-slag remelting in which the temperature is measured in a mould wall over the height of the mould. From this, conclusions are to be drawn about the height and position of the slag zone. However, this method has proved to be impracticable in practice, since by using only one measuring group only one temperature measurement is performed and no heat balance can be established. In contrast to a mere temperature measurement, however, the heat balance can be used to determine the localization of the slag zone much more accurately and correctly. For this, at least two measuring groups are necessary, as it is intended here according to invention. FIG. 3 in JP S63-72837 A also shows in an illustrating manner that the thickness of the slag skin has a considerable influence on the temperature measurement.

SUMMARY OF THE INVENTION

It is the object of the invention to provide a method that is as simple as possible and has as little apparatus requirements as possible, with which the position and the extent (height) of the slag zone in a melting vessel can be determined during an electro-slag remelting method. There is also a need for a melting vessel which can be applied for such a method.

The object is solved by the subject-matter of the patent claims.

According to the invention, a melting vessel for electro-slag remelting of metals or metal alloys is provided, having at least one inner wall and a melting chamber bounded by the inner wall so that there is a boundary surface between the inner wall and the melting chamber. The melting vessel is characterised in that it has measuring devices for measuring the temperature and the measuring devices are arranged in at least two measuring groups, wherein the measuring devices within a measuring group have a substantially same distance to the boundary surface between inner wall and melting chamber and the said distance differs between the measuring devices of different measuring groups and measuring devices within a measuring group are arranged at different heights above the mould. The melting vessel is in particular a mould, preferably a mould which does not oscillate during the method, i.e. is preferably stationary or is not moved during the method. This is particularly preferred if a hood is arranged on the melting vessel—as is also preferred by the invention.

In the electro-slag remelting method, the slag zone has the highest temperature compared to electrode, liquid metal and ingot. Heat is dissipated by a coolant during the method. The invention is based on the knowledge that the detection of the maximum heat flow in the melting vessel can be used for determining the position and extent of the slag zone in the melting vessel.

In preferred embodiments, the melting vessel is coolant-cooled, in particular water-cooled. Preferably, the melting vessel according to the invention has an outer wall and a coolant channel extending between the outer wall and the inner wall.

The measuring devices for measuring the temperature are preferably arranged in the inner wall of the melting vessel. In particular, the measuring devices are arranged in the inner wall so as not to expose them to the aggressive conditions in the melting chamber of the melting vessel. Nevertheless, the measuring devices should be arranged as close as possible to the melting chamber in order to enable the temperature to be measured as reliably as possible. The inner wall has a boundary surface to the melting chamber and preferably a boundary surface to the coolant channel.

The measuring devices are preferably thermocouples. Thermocouples are particularly suitable because they enable continuous measurement over a wide temperature range.

It is advantageous if the measuring group which, in comparison with other measuring groups, has the smallest distance to the inner wall/melting chamber boundary surface is arranged approximately in the middle of the inner wall, in particular in the middle between inner wall and coolant channel. Each further measuring group then has a correspondingly larger distance to the boundary surface. The reason for the arrangement of the measuring devices with sufficient distance to the boundary surface is, among other things, the avoidance of damage to the measuring devices during reworking of the mould. Furthermore, an excessive influence of the cooling channel on the measurement results should be avoided. Preferably, the distance of the measuring devices to the coolant channel is at least 5 mm, more preferably at least 10 mm. In a particularly preferred embodiment, the distance of the measuring devices to the coolant channel is larger than the distance to the next measuring device of another measuring group.

Preferably, the measuring devices are arranged at a distance of at least 5 mm, in particular at least 10 mm, to the boundary surface between inner wall and melting chamber. It has been shown that this distance does not impair the measuring devices on the one hand and on the other hand is useful for a high informative value of the measurements. In this case, the distance refers in particular to the distance in horizontal direction. If the distance between the measuring devices and the melting chamber is too large, the meaningfulness of the measurement results is impaired.

Preferably, the distance of adjacent measuring devices among each other within a measuring group is minimal where, in operation of the melting vessel, the slag zone is arranged. In particular, the distance between adjacent measuring devices increases with increasing distance to the (expected) slag zone. According to the invention, the slag zone is preferably located at a distance of 100 to 600 mm, preferably 200 to 400 mm, preferably about 300 mm below the upper edge of the melting vessel. Such an arrangement achieves the most accurate measurement possible in the relevant area, i.e. where the slag zone is to be located. In an alternative embodiment, adjacent measuring devices within a measuring group substantially have same distances to each other, respectively.

In another alternative embodiment, the maximum distance of adjacent measuring devices within a measuring group is where, in operation of the melting vessel, the slag zone is arranged. In particular, the distance between respective adjacent measuring devices decreases with increasing distance to the (expected) slag zone. In a particularly preferred embodiment, the distances of the measuring devices within a measuring group are minimal where, in operation of the melting vessel, the boundary surfaces slag/metal bath and slag/gas phase are expected. This takes account of the fact that changes in the height or position of the slag zone are to be measured, especially in the slag/metal or slag/gas boundary area.

Preferably, for each measuring device of a measuring group a corresponding measuring device of another measuring group is provided at the same height. Thus, several measuring devices are available at one height, which differ in their distance to the boundary surface between inner wall and melting chamber, but not with regards to their height.

Preferably the distance between adjacent measuring devices within a measuring group is at least 5 mm and more preferably at least 10 mm or at least 30 mm. Falling below this minimum distance increases the costs of the melting vessel without significantly improving the quality of the measurement results. The distance between adjacent measuring devices in a measuring group should be at most 100 mm. This distance is in particular the vertical distance between measuring devices. The measuring devices within a measuring group are preferably arranged in an substantially vertical row. However, they can also be arranged differently, in particular spirally around the melting chamber.

The thickness of the inner wall is preferably at least 15 mm, in particular at least 25 mm. A certain wall thickness should not be undershot in order not to impair the stability of the melting vessel. The inner wall is preferably made of metal, especially copper or copper alloys. Other metals, in particular steel, are conceivable but less preferred.

The melting vessel is in particular a mould and can have different cross-sectional shapes depending on the desired shape of the ingot produced. Like the shape of the melting vessel, the shape of the ingots is not decisive for the function of the invention. The melting vessel can be a crucible in alternative designs, such as in DE 42 07 694 A1. In this case, the shaping is not performed in the melting vessel but in a separate mould. The method step of draining the liquid metal or liquid metal alloy then takes the place of withdrawing the ingot.

The measuring devices are arranged in two or more measuring groups. Different measuring devices belong to a measuring group if they have a substantially same distance to the boundary surface between inner wall and melting chamber. This refers in particular to the horizontal distance to said boundary surface. Preferably, the melting vessel of the invention has at least two measuring groups. Preferably, a first measuring group has a distance A to the boundary surface between inner wall and melting chamber which is smaller than the distance A+C of a second measuring group to the same boundary surface. Preferably, a horizontal distance C between the measuring devices of a first measuring group and the measuring devices of a second measuring group is at least 3 mm, in particular at least 5 mm. The measuring equipment of a measuring group is preferably arranged in a vertical row in parallel to the boundary surface between inner wall and melting chamber.

With the aid of the measuring equipment in the melting vessel of this invention, the temperatures are monitored during the process, in particular continuously, and a heat balance is established from the measured temperature profile. The heat balance is used to draw conclusions about the position of the slag zone in the melting vessel. The placement of a plurality of measuring devices over the relevant area of the melting vessel provides an integral temperature profile, especially within the inner wall. From the heat balance, a maximum can be determined which is correlated to the slag position.

With a suitable arrangement of the measuring devices, it is possible to continuously determine the position of the slag zone and, in combination with geometric calculations and taking into account the melting rate, to reliably determine the ingot withdrawal speed or melting vessel lifting speed to be set.

If several measuring groups, which are located at different depths in the inner wall, are used, according to the invention, it is possible to record multiple temperature profiles simultaneously. Taking into account the known thermal conductivity of the material of the melting vessel, the local heat transport or the heat flux density through the melting vessel can be determined in this way. The heat balance determined with this method provides an improved position description of the slag zone in comparison to simple temperature profiles and allows further conclusions to be drawn about the process control, which could not or only to a limited extent be achieved with the previously described measuring methods.

With the local heat balance, the zone of increased heat input into the mould during the process can be recorded and monitored in more detail than is possible with a simple temperature profile. This allows direct conclusions to be drawn about the operating conditions of the process (e.g. slag temperature, height of the slag zone), which cannot be achieved with other methods or only to a very limited extent. At the same time, the extrapolation of the determined performance profile in the mould can be used to determine the current boundary conditions of the heat transfer at the boundary surfaces of the mould to the melting chamber and, if necessary, at the cooling channel. In this way, critical operating conditions (e.g. bubble boiling) and occurring anomalies in the process control can be effectively identified. In addition, this measuring method provides data that can be used directly for the verification of process models and simulations. As a consequence, model-based process management is made possible. Preferably, the heat balance is determined during the method, especially continuously. Depending on the heat balance, in particular the immersion depth of the electrode and/or the amount of slag dosing can be adjusted.

The melting vessel preferably has at least two measuring devices, more preferably at least three measuring devices, more preferably at least four measuring devices and more preferably at least six measuring devices. It has been shown that a good position determination of the slag zone within the melting vessel is possible with a not too small number of measuring devices. As the number of measuring devices increases, the meaningfulness and accuracy of the data obtained increases, as do the manufacturing costs of the melting vessel. Preferably, the melting vessel has at most 100 measuring devices, in particular at most 60 measuring devices and preferably at most 40 or at most 25 measuring devices. Each measuring group shall preferably have at least two, in particular at least three, at least four, or at least five, preferably at least six measuring devices or at least eight measuring devices. Preferably, the number of measuring devices per measuring group should not be more than 25, in particular not more than 18 and especially preferred not more than 14. The use of a very large number of measuring devices increases the cost of the system and the complexity of its operation without providing significant advantages with regard to the informative value of the measurement.

Since the measuring devices are located in a current-carrying melting vessel, they are preferably electrically insulated. Preferably, the measuring devices are glued into the inner wall, especially from the direction of the coolant channel in bores. The electrical insulation is preferably provided by the adhesive used. The adhesive also prevents coolant from entering into the bore.

A method for electro-slag remelting of metals or metal alloys with the following steps is according to the invention as well:

A. Providing in a melting vessel of this invention at least one electrode of the metal or metal alloy to be melted, B. Providing slag in the melting vessel, C. Melting the electrode so that the molten metal or the molten metal alloy passes through a slag zone and solidifies into an ingot, whereby a heat balance is established, in particular continuously, by means of the information obtained via the measuring devices. Preferably, during the melting, the position of the slag zone, in particular also its height, in the melting vessel is determined via measuring devices and the heat distribution in the melting vessel determined this way.

It is a particular advantage of the method according to the invention and the melting vessel according to the invention that the temperature measurement with the aid of the measuring devices not only allows a statement to be made about the position of the slag zone, but also its extent in the height direction can be reliably determined. In addition, the heat distribution in the mould can be visualised and used to take into account the position of the slag height in the melting vessel. Since there are embodiments in which slag components are continuously removed via the withdrawn ingot during the process, it makes sense to be able to determine the amount of slag present. This possibility is particularly advantageous in methods in which the ingot is withdrawn from the melting vessel during the melting. Such methods are, according to the invention, preferred for reasons of coaxiality during current flow.

The metal or metal alloy to be remelted in the method is preferably selected from steels (high or low alloyed), superalloys and nickel-based alloys.

In a preferred embodiment of the method according to the invention, the determined position or height of the slag zone is compared with a target position or target height and in the event of a deviation of the position or height of the slag zone from the target position or target height, influencing of the position or height of the slag zone is performed. The same applies in particular to the immersion depth of the electrode into the slag zone.

The upper slag zone is located about 100 to 600 mm, preferably 200 to 400 mm, preferably about 300 mm below the upper edge of the melting vessel. The numbers can vary slightly depending on the diameter of the melting vessel and electrode, since the radiation upwards must be taken into account. The "slag zone" is the area of the melting chamber which is, in operation, filled with slag. It is located between the boundary surface metal bath/slag and slag/gas phase. The slag zone is variable in position and height. The "slag height" is the vertical distance between the two boundary surfaces mentioned, where this distance is largest. Since the heat balance established according to the invention permits a very precise determination of position and height of the slag zone compared with other methods, slag heights in the range from 50 to 500 mm, in particular from 75 mm to 400 mm or from 100 mm to 300 mm can be used. In particular, there is no danger of the slag height assuming too low a value. A minimum slag height should not be undershot in order to generate a sufficient resistance and thus keep power consumption economical. If the slag height becomes too small, slag can be re-dosed. With decreasing slag height and the associated lower heat content of the slag and increasing electrical currents, the risk of breakthrough of the slag or the risk of metal run-off increases. The precise checking of the slag zone is therefore of particular importance for the method.

Preferably, if the position of the slag zone deviates downward, a deceleration of the withdrawal of the ingot from the melting vessel is caused. According to the invention, preferably no adjustment of the coolant quantity or the coolant flow rate occurs in the method. A variation of these parameters would lead to a change in the shape of the liquid metal bath. The bath shape and the bath height, however, should preferably be kept as constant as possible according to the invention. The bath height is regulated via the power input (melting energy for melting the electrode). The melting rate is preferably kept substantially constant. In other words, although the melting rate can be regulated via the power input, according to the invention a constant melting rate is preferred to achieve a constant flat metal bath.

The slag material is, according to the invention, preferably selected from the group consisting of calcium fluoride, calcium oxide, magnesium oxide, aluminium oxide, silicon dioxide and mixtures thereof. Small amounts of titanium oxide or suboxides of titanium, boron oxide, lanthanum oxide or other rare earth oxides may be added to the slag material if necessary. Small amounts are in particular amounts of less than 10% by weight, preferably less than 5% by weight relative to the total amount of slag material at the beginning of the method.

If the position of the slag zone deviates upward, the withdrawal of the ingot from the melting vessel is accelerated. Due to the temperature measurement or the preparation of the heat balance via the measuring devices occurring during the method, it is possible to react flexibly to the condition of the slag zone.

In a preferred embodiment, the ingot produced by the method according to the invention has a cross-section diameter of more than 600 mm, in particular more than 700 mm or more than 800 mm. Compared to continuous casting, the ingot diameter obtained by the method of invention is particularly large.

It is an advantage of the method according to the invention that a relatively flat metal bath can be used. This is made possible by the improved checking of the ingot/metal bath and metal bath/slag boundary surfaces. The "bath depth" is the vertical distance between the mentioned boundary surfaces, namely where this distance is greatest. This is usually in the middle of the melting chamber. The bath depth preferably is at most $2 \times D$, in particular at most $1.5 \times D$ or at most of $1 \times D$ (D=cross-sectional diameter of the ingot produced without slag skin in millimeters). The bath depth, however, should preferably not be less than $0.1 \times D$, more preferably at least $0.2 \times D$ or at least $0.25 \times D$. Maintaining an advantageous bath depth avoids errors in the ingot. These bath depths are relatively small. In continuous casting in particular, the high casting rates used there result in significantly greater bath depths. In contrast, the supply of molten metal in the form of the melting rate in the method according to the invention is low. In a preferred embodiment, the melting rate in kg/h in the method according to the invention does not exceed the value of $2.5*D$, preferably $2.0*D$, and particularly preferred $1.5*D$ or $1.0*D$. Example: with an ingot cross-section diameter of D=800 mm, the maximum melting rate is $2.5*800=2000$ kg/h. Due to this low melting rate, the advantageous shallow bath depth and the desired quality of the ingot are achieved. The melting rate can easily be measured by weighing the electrode.

Due to the very low melting rate of the ingot, especially compared to the casting rate in continuous casting, a so-called "slag skin" forms on the ingot produced. This slag skin is a layer of solidified slag which is located on the outside of the ingot produced. Thus the melt and the ingot produced are not in contact with the wall of the melting vessel in the method according to the invention. The slag skin influences the heat dissipation. The heat balance established according to the invention also allows statements to be made on the thickness of this slag skin.

In the method according to the invention, the average withdrawal and lifting speeds are preferably a maximum of 10 mm/min, a maximum of 8 mm/min and particularly preferably a maximum of 5 mm/min. In particular, they are at least 0.1 mm/min, preferably at least 0.5 mm/min. The larger the dimensions become, the lower the withdrawal and lifting speeds. In a preferred embodiment, the product of withdrawal or lifting speed with the inner diameter of the melting vessel is at least 1000 and at most 5000 mm$^2$/min, or from 2000 to 3500 mm$^2$/min. For example, it has been shown to be advantageous to withdraw with a crucible diameter of 1000 mm at a speed of 3 mm/min (3 mm/min*1000 mm=3000 mm$^2$/min).

The inner diameter of the melting vessel is preferably at least 500 mm, in particular at least 800 mm or at least 1000 mm. In preferred embodiments, this diameter is at most 4000 mm or at most 3000 mm. Especially in the case of larger diameters, the method according to the invention is advantageous.

In a preferred embodiment, at least two, at least three or at least four electrodes are employed in the method. This has the advantage that if one of the electrodes is replaced, the others can continue to be used. The inventive method can then also be employed for positioning and selection of the electrodes, which is a significant advantage.

If the term "metal" is used in this description, it also includes metal alloys. In summary, the method according to the invention allows one, several or all of the following steps to be performed:

Detecting position and height of the slag zone,
Starting the ingot withdrawal at a predetermined position of the slag zone (the slowly growing block pushes the slag zone up in front of it), Optimizing the energy input during electrode replacement to keep the thickness of the slag skin constant (during electrode replacement, the excess in power input at the new electrode can be limited by the heat load in the melting vessel), Monitoring the slag height (slag height decreases during the process), Controlling the adding of slag components, e.g. adding of oxidic components at higher temperatures and/or adding of fluorspar at lower temperatures to influence the viscosity of the slag, Keeping the slag skin constant by adding slag components (for improved control of the heat balance), Monitoring of the edge shell of the slag, Detecting slag run-offs during cupping heating, Avoidance of a weakening of the edge shell, Measurement of the slag movement, Achieving homogeneous heat loads (e.g. via control of the immersion depth of the electrode), Regulation of the power input during the cupping heating depending on the heat load dissipated.

The possibility of detecting slag run-offs and the corresponding regulation of the power input makes an efficient and low-risk cupping heating possible, whereby the quality of the ingot produced can be further improved. It is therefore preferable that the method of this invention has a step of the cupping heating.

The remaining heat in the melting chamber (or melting pool) can be calculated via the arrangement of the measuring devices and the calculation of the heat load over the melting vessel, and the slag thickness at the edge shell (melting vessel/slag) can be influenced via variable process conditions (e.g. immersion depth of the melting electrode into the slag and/or increase in output to melt the electrode) and an optimum operating point (maximum heat dissipation) can be determined without weakening the edge shell of the slag. In this way, unwanted slag run-offs are avoided. If the edge shell of the slag is too thick or too thin, there is a risk of slag run-off.

Furthermore, it is possible to set the withdrawal speed/lifting speed via the exact recording of the slag zone at the melt zone and slag zone separation point and to permit an increase in the freeboard (slag zone at the top and upper edge of the melting vessel).

The use of a melting vessel according to the invention in an electro-slag remelting method is also according to the invention.

BRIEF DESCRIPTION OF THE FIGURES

The figures represent simplified drawings that are not true to scale. They show.

DETAILED DESCRIPTION OF THE INVENTION

Figure 1:
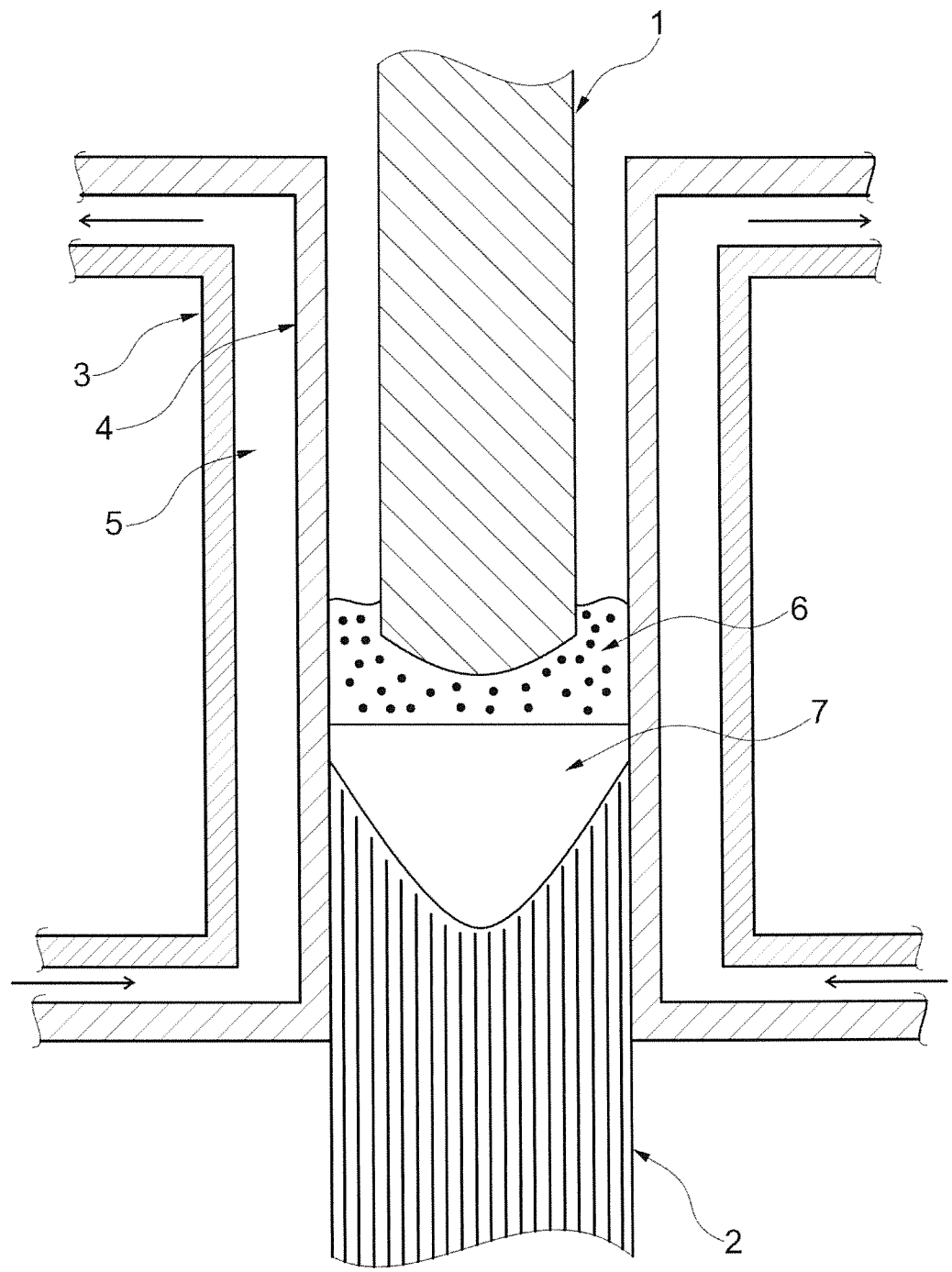
FIG. 1 A sectional view of a prior art melting vessel.

FIG. 1 shows the substantial elements of a melting vessel for electro-slag remelting methods, as used as well in the prior art. The melting vessel is shown in a vertical sectional view. The vessel is designed as a mould and has an outer wall 3, an inner wall 4 and a coolant channel 5 arranged between the outer wall 3 and the inner wall 4. Coolant, especially water, flows through coolant channel 5, preferably from bottom to top through the coolant channel 5 (symbolized by the arrows). An electro-slag remelting method is performed in the melting vessel, in which an electrode 1 is introduced from above into the melting vessel and its tip is immersed in a slag zone 6. As a result of the current flow, the slag zone 6 heats up strongly due to its high electrical resistance and melts the tip of electrode 1 so that molten metal passes through the slag zone 6 and collects in the melting vessel as liquid metal or liquid metal alloy 7 before it solidifies into the ingot 2. The ingot 2 can be withdrawn downwards out of the melting vessel or the melting vessel can be moved upwards. The electrode 1 can be further supplied into the melting vessel from above. The features shown in FIG. 1 are preferably also found in the melting vessel or method of this invention.

Figure 2:
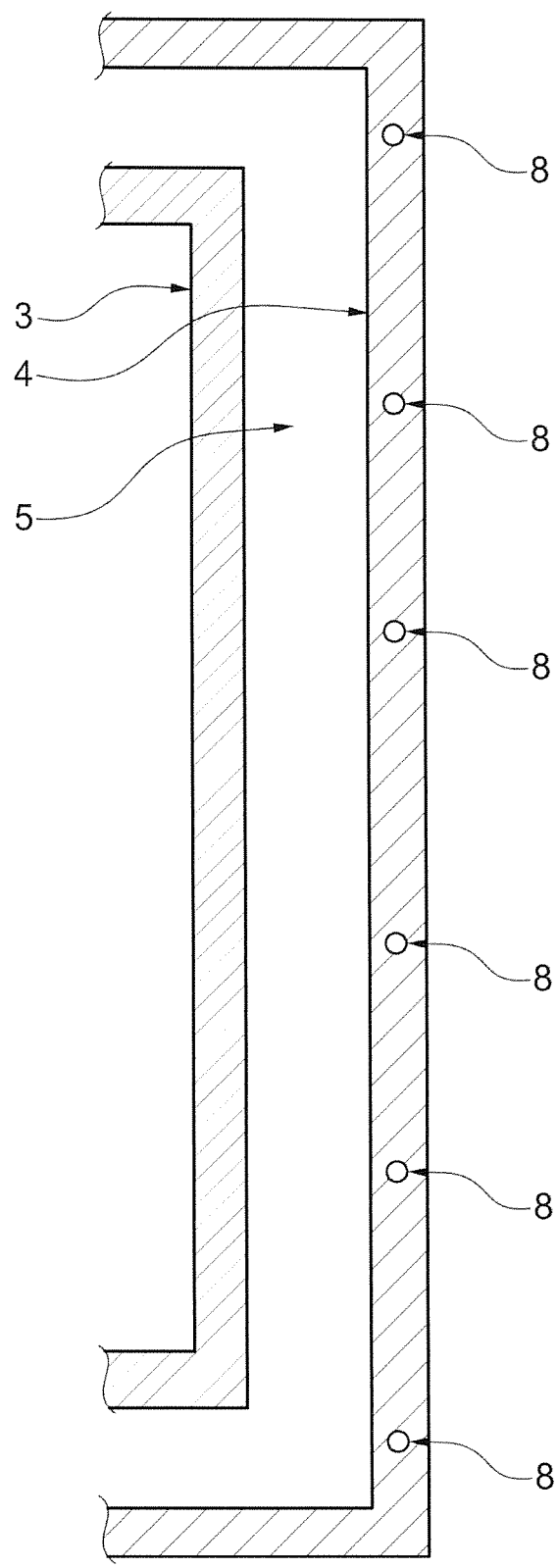
FIG. 2 A sectional view of the walls of a melting vessel according to the invention.

FIG. 2 shows a vertical sectional view through the walls of a melting vessel according to the invention which has an outer wall 3, an inner wall 4 and a coolant channel 5 arranged between outer wall 3 and inner wall 4. In the inner wall 4, a plurality of measuring devices 8 is arranged at different heights, namely in a vertical row in parallel to the boundary surface of the inner wall to the melting chamber.

Figure 3:
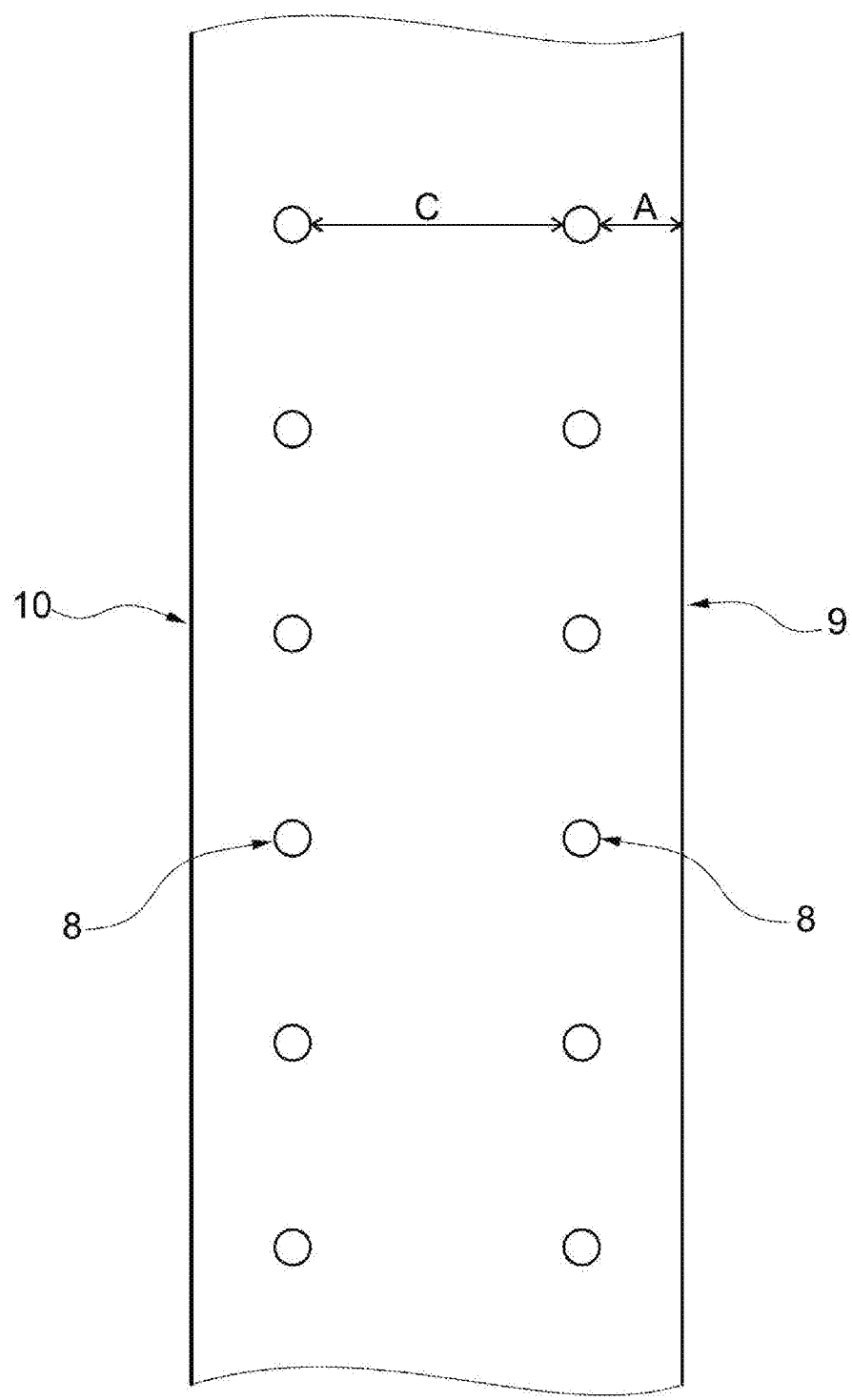
FIG. 3 Enlarged sectional view of a part of an inner wall of a melting vessel according to the invention.

FIG. 3 shows an in comparison to FIG. 2 enlarged vertical sectional view through a part of an inner wall of a melting vessel according to the invention. The here shown inner wall of a melting vessel according to the invention has a plurality of measuring devices 8. The measuring devices are arranged in measuring groups, whereby the measuring devices 8 within a measuring group have a substantially same distance to the boundary surface 9 between inner wall and melting chamber. A first measuring group shown here has measuring devices 8 which have a distance A to the boundary surface 9 between inner wall and melting chamber. The distance of this first measuring group to the boundary surface 9 between inner wall and melting chamber is smaller than the distance A+C of a second measuring group to the same boundary surface.

Figure 4:
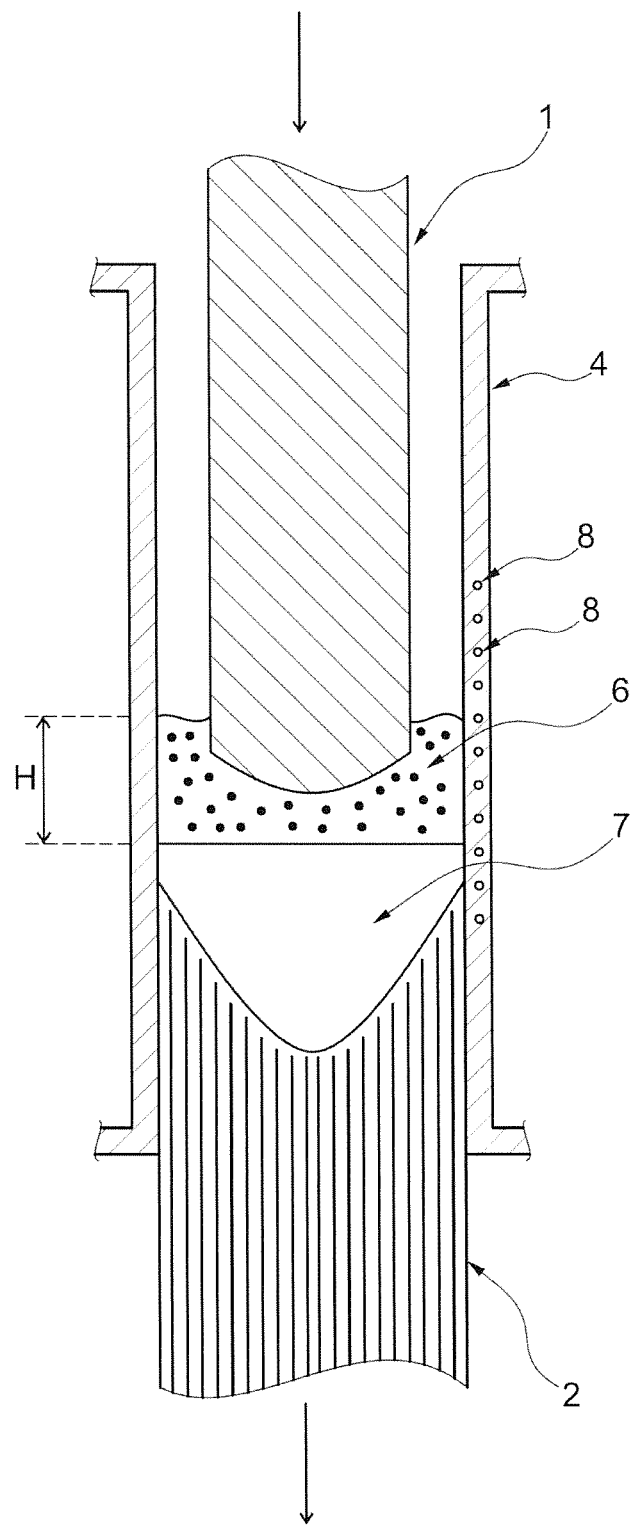
FIG. 4 A sectional view of a melting vessel according to the invention.

FIG. 4 shows a vertical sectional view of a melting vessel according to the invention in the form of a mould. Shown are the electrode 1 and ingot 2 as well as slag zone 6 and molten metal or metal alloy 7. Furthermore, a plurality of measuring devices 8 is shown here, which are arranged at different heights in the inner wall 4 and are represented by small circles. The arrows symbolize the repositioning of the electrode 1 or the withdrawal of the ingot 2 according to a preferred embodiment. Outer wall and coolant channel are not shown. Shown is an embodiment with a measuring group of measuring devices 8 in a vertical row to determine the position and height (H) of the slag zone 6. Several rows in a measuring group are also conceivable and according to the invention. The rows do not have to extend vertically, but can also be arranged distributedly over the melting vessel with same distance to the melting chamber at different heights.

Figure 5:
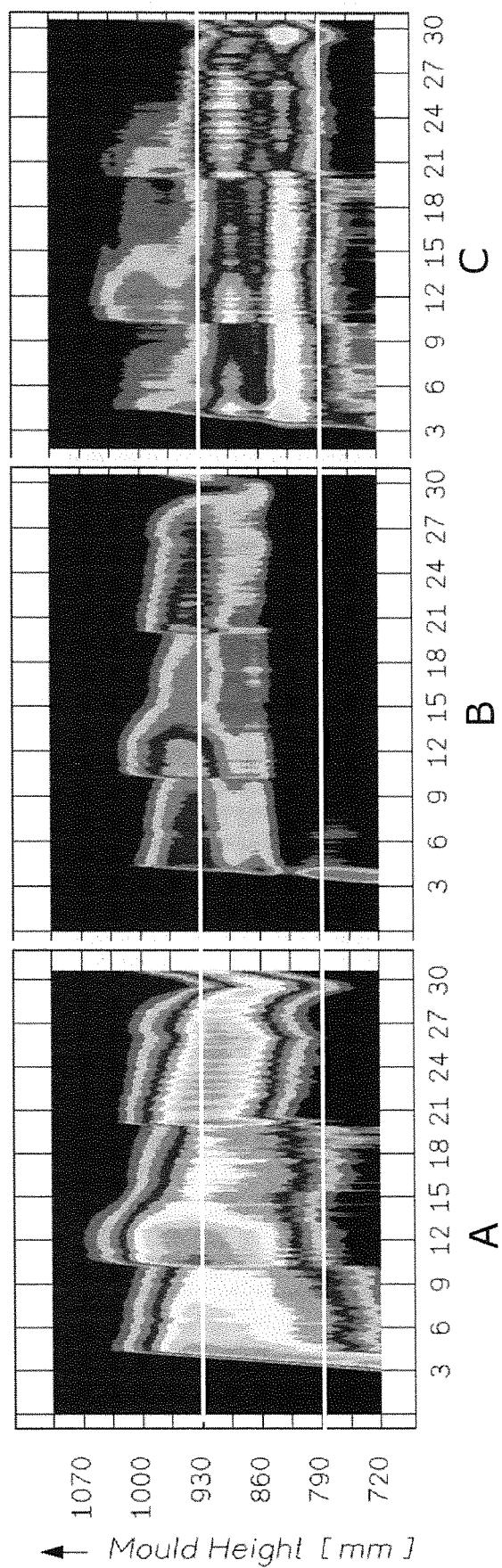
FIG. 5 Three diagrams of the measured temperature near the melting chamber (A), at a greater distance to the melting chamber (B), and of the heat flux density (C).

FIG. 5 shows three diagrams marked A, B and C from left to right. All diagrams show the time in hours on the X-axis and the height of the mould in millimeters on the Y-axis. All three diagrams show measurement results from a single melting process. Diagram A shows the measured temperature of measuring devices of a measuring group with small distance to the melting chamber. Diagram B shows the measured temperature of a measuring group having a slightly larger distance to the melting chamber. The brighter areas show a higher temperature than the darker areas. In contrast to the diagrams A and B, diagram C shows the heat balance in the form of heat flux densities over the height of the mould. Areas of a higher heat flux density are shown brighter than those with lower heat flux densities. The heat flux densities of Diagram C were calculated from the measurement values shown in the diagrams A and B. The two horizontally extending lines indicate the actual location of the slag zone. It can be seen that the temperature measurements of the diagrams A and B do not show the highest temperature in the area of the slag zone, but suggest that the slag zone is located higher than it actually is.

LIST OF REFERENCE NUMERALS 1 electrode
2 ingot
3 outer wall
4 inner wall
5 coolant channel
6 slag zone
7 liquid metal or metal alloy
8 measuring devices
9 boundary surface to the melting chamber
10 boundary surface to the coolant channel

What is claimed is:

1. A method for electro-slag remelting of metals or metal alloys in a melting vessel, said melting vessel having at least one inner wall and a melting chamber bounded by the at least one inner wall so that there is a boundary surface between the at least one inner wall and the melting chamber,
wherein the melting vessel has measuring devices for measuring temperature and the measuring devices are arranged in at least two measuring groups,
wherein the measuring devices within a measuring group each have substantially a same distance to the boundary surface between the at least one inner wall and the melting chamber,
the distance to the boundary surface between the at least one inner wall and the melting chamber differs between the measuring devices of different measuring groups,
measuring devices within the same measuring group are arranged at different heights, wherein the measuring group which, in comparison with other measuring groups, has the smallest distance to the at least one inner wall/melting chamber boundary surface is arranged approximately in the middle of the at least one inner wag, in the middle between the at least one inner wall/melting chamber boundary surface and the coolant channel; and
comprising the steps of:
A. providing in the melting vessel at least one electrode of the metal or metal alloy to be melted,
B. providing slag in the melting vessel,
C. melting the electrode so that the molten metal or metal alloy passes through a slag zone and solidifies into an ingot,
wherein a heat balance is established continuously by information obtained via the measuring devices.

2. The method according to claim 1, wherein the ingot is withdrawn from the melting vessel during the melting, and/or the melting vessel is lifted in relative movement to a growing ingot.

3. The method according to claim 2, wherein a withdrawal or lifting speed is at least 0.01 cm/min and at most 10 cm/min.

4. The method according to claim 2, wherein a product of withdrawal or lifting speed with the at least one inner diameter of the melting vessel is at least 1000 and at most 5000 mm²/min.

5. The method according to claim 1, wherein a determined position of the slag zone is compared with a target position and in the event of a deviation of the position of the slag zone from the target position, influencing of the position of the slag zone is performed.

6. The method according to claim 5, wherein in the event of a downward deviation of the position of the slag zone, an increase of a melting rate and/or a deceleration of withdrawal of the ingot from the melting vessel or of the lifting of the melting vessel is caused.

7. The method according to claim 5, wherein in the event of an upward deviation of the position of the slag zone, a decrease of a melting rate and/or an acceleration of withdrawal of the ingot from the melting vessel or of the lifting of the melting vessel is caused.

8. The method according to claim 1, wherein a slag height is compared with a target height and in the event of a downward deviation of the height of the slag zone, slag material is re-dosed.

9. The method according to claim 1, wherein during the melting, a position of the slag zone, also its height, in the melting vessel is determined via the measuring devices.

10. The method according to claim 9, wherein an immersion depth of the at least one electrode into the stag zone and/or an amount of slag dosing is corrected depending on heat balance.

11. The method according to claim 1, wherein a vertical distance between an ingot/metal bath and metal bath/slag boundary surfaces is at most twice a cross-sectional diameter of the ingot produced.

12. The method according to claim 1, wherein a melting rate does not exceed a value of 2.5 kg/h multiplied by a cross-sectional diameter in millimeters of the ingot produced.

13. A melting vessel for electro-slag remelting of metals or metal alloys, said melting vessel comprising at least one inner wall and a melting chamber bounded by at least one the inner wall so that there is a boundary surface between the at least one inner wall and the melting chamber,
wherein the melting vessel has measuring devices for measuring temperature and the measuring devices are arranged in at least two measuring groups,
wherein the measuring devices within a measuring group have substantially a same distance to the boundary surface between the at least one inner wall and the melting chamber,
the distance to the boundary surface between the at least one inner wall and the melting chamber differs between the measuring devices of different measuring groups,
the measuring devices within the same measuring group are arranged at different heights; and
wherein the measuring group which, in comparison with other measuring groups, has the smallest distance to the at least one inner wall/melting chamber boundary surface is arranged approximately in the middle of the at least one inner wall, in the middle between the at least one inner wall/melting chamber boundary surface and the coolant channel.

14. The melting vessel according to claim 13, wherein the measuring devices are arranged in the at least one inner wall of the melting vessel.

15. The melting vessel according to claim 13, wherein the melting vessel has an outer wall and a coolant channel arranged between the outer wall and the at least one inner wall.

16. The melting vessel according to claim 13, wherein the measuring devices are thermocouples.

17. The melting vessel according to claim 13, wherein a first measuring group has a distance A to the boundary surface between the at least one inner wall and the melting chamber which is smaller than the distance A+C of a second measuring group to the same boundary surface.

18. The melting vessel according to claim 13, wherein the distance of adjacent measuring devices within the same measuring group is minimal in a region where, in operation of the melting vessel, the metal bath/slag and/or slag/gas phase boundary surface is arranged.

19. The melting vessel according to claim 13, wherein a horizontal distance C between the measuring devices of a first measuring group and the measuring devices of a second measuring group is at least 3 mm.

20. The melting vessel according to claim 13, wherein for each measuring device of the same measuring group a corresponding measuring device of another measuring group is provided at the same height.

21. The melting vessel according to claim 13, wherein the number of measuring devices per measuring group is at least five.

* * * * *